US012372248B2

(12) United States Patent
Mandl et al.

(10) Patent No.: US 12,372,248 B2
(45) Date of Patent: Jul. 29, 2025

(54) HEATING DEVICE FOR A HOB, AND HOB WITH SUCH A HEATING DEVICE

(71) Applicant: E.G.O. Elektro-Geraetebau GmbH, Oberderdingen (DE)

(72) Inventors: Matthias Mandl, Bretten (DE); Martin Roth, Kraichtal (DE); Kay Schmidt, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 416 days.

(21) Appl. No.: 17/822,179

(22) Filed: Aug. 25, 2022

(65) Prior Publication Data

US 2023/0091878 A1 Mar. 23, 2023

(30) Foreign Application Priority Data

Sep. 20, 2021 (DE) ..................... 10 2021 210 399.5

(51) Int. Cl.
*F24C 7/08* (2006.01)
*H05B 1/02* (2006.01)

(52) U.S. Cl.
CPC .............. *F24C 7/087* (2013.01); *F24C 7/083* (2013.01); *H05B 1/0213* (2013.01)

(58) Field of Classification Search
CPC ........ F24C 7/083; F24C 7/087; F24C 15/105; F24C 15/106; H05B 1/0213
See application file for complete search history.

(56) References Cited

U.S. PATENT DOCUMENTS

| | | | | |
|---|---|---|---|---|
| 1,924,647 A | | 8/1933 | McGregor | |
| 2,944,135 A | * | 7/1960 | Holtkamp | F24C 15/106 335/145 |

(Continued)

FOREIGN PATENT DOCUMENTS

| | | | |
|---|---|---|---|
| CA | 3010966 A1 | 6/2019 | |
| CH | 204195 A | 4/1939 | |

(Continued)

OTHER PUBLICATIONS

European Patent Office, Extended European Search Report received for Application No. 22191507.7, dated Jan. 25, 2023, 9 pages, Germany.

(Continued)

*Primary Examiner* — Thien S Tran
(74) *Attorney, Agent, or Firm* — Alston & Bird LLP

(57) ABSTRACT

A heating device for a hob has a flat carrier having a heating conductor side with heating conductors thereon and a switching device, the switching device having a movable switching contact and a mating contact associated therewith. The switching device has a switching arm movable in itself, said switching arm carries the switching contact and is electrically connected to an electric arm connecting means. The switching arm is fastened on the carrier and is formed from a bimetal strip. The mating contact is electrically connected to an electric mating connection means and fastened on the carrier. Switching arm, switching contact and mating contact are designed and arranged such that when a pre-defined switching temperature is exceeded, the switching contact and the mating contact are brought together, triggering a switching operation as a hot indicator for the hob, by the movement of the switching arm due to increasing heat.

22 Claims, 4 Drawing Sheets

(56) References Cited

U.S. PATENT DOCUMENTS

| | | | | | |
|---|---|---|---|---|---|
| 3,092,323 | A * | 6/1963 | Wantz | F23N 1/00 236/68 R |
| 3,209,106 | A | 9/1965 | Huffman | |
| 4,386,263 | A * | 5/1983 | Fischer | F24C 15/105 219/448.11 |
| 4,772,777 | A | 9/1988 | Weller et al. | |
| 6,121,587 | A | 9/2000 | Leiprecht et al. | |
| 2004/0003727 | A1 * | 1/2004 | McWilliams | H05B 3/748 99/483 |
| 2005/0274710 | A1 * | 12/2005 | Toyos | H05B 3/68 219/448.11 |
| 2006/0250209 | A1 | 11/2006 | Yu | |
| 2013/0146585 | A1 | 6/2013 | Wilde | |

FOREIGN PATENT DOCUMENTS

| | | | |
|---|---|---|---|
| DE | 854592 | C | 11/1952 |
| DE | 19638517 | A1 | 3/1998 |
| DE | 19803507 | A1 | 8/1999 |
| DE | 20308794 | U1 | 9/2003 |
| EP | 0045007 | A1 | 2/1982 |
| EP | 0219675 | A1 | 4/1987 |
| JP | S50-124143 | U | 10/1975 |

OTHER PUBLICATIONS

English Translation of EP Office Action dated Jun. 12, 2024 for EP Application No. 22191507, 6 page(s).

EP Office Action Mailed on Jun. 12, 2024 for EP Application No. 22191507, 7 page(s).

German Patent and Trade Mark Office, Office Action received for Application No. 102021210399.5, dated May 31, 2022, 6 pages, Germany.

English Translation of EP Office Action dated May 16, 2025 for EP Application No. 22191507, 8 page(s).

EP Office Action Mailed on May 16, 2025 for EP Application No. 22191507, 7 page(s).

* cited by examiner

HEATING DEVICE FOR A HOB, AND HOB WITH SUCH A HEATING DEVICE

CROSS-REFERENCE TO RELATED APPLICATIONS

This application claims priority to German Application No. 10 2021 210 399.5, filed Sep. 20, 2021, the contents of which are hereby incorporated herein in its entirety by reference.

AREA OF APPLICATION AND PRIOR ART

The invention relates to a heating device for a hob and to a hob with such a heating device, the heating device preferably being a hot plate heater.

A heating device for a hob with very low power output is known from US 2013/0146585 A. It can be used to keep hot cooking utensils placed in a hob there above. The heating device requires only a low power output, for example between 50 W and 150 W.

OBJECT AND SOLUTION

The object underlying the invention is to create a heating device mentioned at the outset and a hob provided with such a heating device, using which problems of the prior art can be solved and with which it is in particular possible to create a practicable and easily fitted heating device that can be manufactured at preferably low cost.

This object is solved by a heating device a hob having the features of the appended claim. Advantageous and preferred embodiments of the invention are the subject matter of further claims and are explained in more detail in the following. Some of the features are described only for the heating device or only for the hob. They are however intended to apply by themselves and independently of one another both for such a heating device and for such a hob. The wording of the claims is based on express reference to the content of the description.

The heating device is designed for use in a hob and has a flat/planar carrier having a heating conductor side and an opposite rear side. Furthermore, it has at least one heating conductor on the heating conductor side and a switching device, the switching device having a movable switching contact and a mating contact associated with this switching contact. The switching device has a switching arm movable/moving in itself or being bendable, which switching arm preferably deforms or can bend due to thermal effects or when exposed to heat. It can for example form a warm indicator or standard hot indicator for the heating device on the hob, warning a user that the hob is hot/dangerous at this location of the heating device. This also applies for the case that the heating device generates, due to a relatively low installed power, temperatures that are not particularly high, but only around 80° C. to 150° C. The switching arm carries the switching contact and is electrically connected to an electric arm connecting means, the switching arm being fastened on the carrier. In particular, it is fastened with an end area onto the carrier. The mating contact is electrically connected to an electric mating connection means and is preferably also fastened on the carrier. The switching arm has a bimetal strip or is formed from a bimetal strip. The switching arm, switching contact and mating contact are designed and arranged such that when a pre-defined switching temperature is exceeded, the switching contact and the mating contact are either separated or brought together, triggering a switching operation, by the movement of the switching arm due to increasing heat. This switching operation is used to signal heating up to a user or in general, for example by means of a standard hot indicator. An opposite movement of the switching arm due to cooling down then takes place for a complementary switching operation that reverses the signal.

Although the switching arm is formed from a bimetal, it is advantageously not designed as a snap-action switch. The switching arm is designed particularly advantageously without snap function. It can therefore be designed simpler and less expensive as well as sturdier and less prone to error. Due to the low currents to be switched, a particularly fast switching operation is not needed either for closing or opening of a contact.

The switching contact is arranged on a free end of the switching arm, in particular arranged on a side of the switching arm that faces the carrier. The switching arm can advantageously be designed flat here. That makes it particularly easy to move.

The switching arm is preferably a bimetal strip and consists of straight sections and/or of sections angled by a maximum of 45° or correspondingly curved by 45°. The change in the shape can be either continuous due to the curvature or sharply angled at an edge. It can thus be of plain design. The switching arm can consist particularly preferably of two straight sections connected to one another at an angle. A precise shape and an exactly predeterminable shape change can be set by the angled offset.

In a possible development of the invention, the switching arm is in turn a bimetal strip and consists of straight sections and/or of sections that are at an angle between 15° and 90° relative to one another or are correspondingly curved. This means that adjacent sections each have a corresponding angle to one another. Advantageously, the switching arm can here consist of exactly three or at least three sections, in particular of three straight sections. These can be a fastening section for fastening on the heating device, a central section and a switching contact section in turn adjoining it and carrying the switching contact. An angle as mentioned above can be provided between these three sections. In particular, it can be provided here that the fastening section and the switching contact section are parallel to one another, i.e. they are offset parallel to one another and/or the switching arm has a kind of 'Z' shape. Practice has shown that advantages for dimensional accuracy can be achieved as a result and that simpler measurement of a contact spacing is possible. A further possibility is for the fastening section and the switching contact section to be longer than the central section, advantageously two to ten times as long as the central section.

Alternatively, the switching arm may be slightly bent or angled at a slight angle to a first section of the central section at the fastening section for fastening to the heater. The switching arm may have a central section angled in on itself, preferably with two sections of the central section. These two sections may be angled away from each other by a relatively small angle, advantageously between 1° and 20° or between 5° and 12°. This allows the fastening section to lie flat and parallel against the carrier and to be fastened. The first section of the central section, which directly adjoins the fastening section, raises the switching arm slightly above the carrier, but advantageously not too far, so that the switching arm is still strongly heated by the carrier. A second section of the central section is relatively strongly angled with respect to the first section, for example by the aforementioned angle between 15° and 90° or between 40° and 50°.

This second section is preferably shorter than the first section, in particular about as long as in the previously explained embodiments. This is followed by the switching contact section or a free end with the switching contact, which is advantageously angled so that it runs parallel to the first section of the central section. Compared to the aforementioned design, the more angled second section of the central section and thus also the switching contact section is higher above the mounting plane of the switching arm.

A curved design of the switching arm advantageously consists of a continuous curvature that extends at least over one area of its length. It is thus possible to fasten the switching arm with a flat side on one end at the carrier. Due to the angled offset or curve, it is possible for the switching arm to extend over the carrier and thus can also extend at a distance over the mating contact. Due to heating up by the heating conductor and due to the bimetallic properties, the switching arm bends as the temperature increases and can move the switching contact to the mating contact or, at or above a previously determined switching temperature, press it against the mating contact and thereby trigger the switching operation. In the cold state and at room temperature, the switching contact is then at a distance from the mating contact, and in the hot state it is in contact therewith.

In another embodiment, the switching arm can be designed straight when it is mounted on the carrier. It can be in contact, with a precisely determined pretension, with the switching contact on the mating contact, being pre-curved to do so. When heated, the switching arm bends or the switching contact then moves, at or above a previously determined switching temperature, away from the mating contact. In the hot state, the switching contact is then at a distance from the mating contact, while in the cold state or at room temperature it is in contact therewith. The switching operation is then precisely reversed from the previous one. These two options are available. The switching temperature can be selected such that a temperature of between 50° C. and 90° C. prevails at a hob plate above the heating device.

In a further embodiment, the switching arm has a fastening section, which in particular has a length of between 10% and 30% of the total length of the switching arm. It is therefore relatively short, but advantageously has no other function than to fasten the switching arm. The length of the remaining switching arm can preferably be movable and can therefore deform, in particular due to the bimetallic effect. The switching contact can be arranged on a free end area or end section of the switching arm, advantageously shortly in front of its end. It should be arranged on that side of the switching arm facing the carrier, i.e. on the underside.

The switching contact can advantageously have a projecting edge in order to form a linear contact when it contacts a surface, where the edge can advantageously extend in a longitudinal direction of the switching arm. It can thus be ensured that the switching contact also actually establishes an electrical contact when it is in contact with the mating contact, regardless of how much the switching arm or its free end is deflected.

In another further embodiment of the invention, the switching arm can be fastened immovably to the carrier together with the arm connecting means, such that an electrical connection to the switching arm is direct or is made directly thereto. To do so, a previously mentioned fastening section can be provided, which can be connected to the arm connecting means or be in contact therewith. The switching arm can be advantageously riveted to the carrier, forming a durable and secure connection.

Advantageously, a positive connection of the switching arm to the carrier or to the electric arm connecting means can be provided at the fastening section, where a retaining projection and a retaining recess are provided particularly advantageously for this positive connection. The positive connection is intended to prevent any rotation of a switching arm that is fastened to one point or is rotatable, such that its switching contact always makes contact with the mating contact provided when moved due to heating up. The retaining projection is provided preferably on the fastening section, advantageously as an elongated projection, arm or lug protruding from the end of the fastening section in the same direction. The retaining recess can be provided on the arm connecting means, preferably as a recess or hole, where the retaining projection can be introduced or inserted during fitting of the switching arm. Once it is fastened on the carrier, the switching arm is then in all cases precisely aligned as required, allowing a secure electrical contact to be achieved between the switching contact and the mating contact. For this purpose, the switching arm can be fastened to rest on the switching contact, so there is still a section of the switching contact between the switching arm and the carrier.

Alternatively, the switching arm can be fastened directly to the carrier, in particular under the arm connecting means. For this purpose, the carrier should be electrically insulating or have a covering layer that forms an electrical insulation. The arm connecting means presses the switching arm against the carrier so that it is fixed to it, advantageously with the aforementioned fastening section. This has the advantage that the switching arm is arranged very close to the carrier and runs close to it and is thus also heated very quickly and immediately, at least closer than if it were fastened on top of the arm connecting means. This can shorten the switching time or the reaction time, respectively. The above-described design of the switching arm, which has a double-angled central section, is particularly suitable for this purpose. Preferably, the arm connecting means should press the switching arm onto the carrier over a length that is not too long, so that the switching arm can move freely even with the central section.

In a development of the invention, the switching arm can be in strip form and/or have an elongated rectangular shape, and in particular be designed with a constant width. Its length can be at least two times greater than its width, preferably at least three times or five times greater than its width. This applies in particular for that area of the switching arm which can move and is not fastened to the carrier, which is what makes it non-deformable or immovable in a manner of speaking. These dimensions thus apply advantageously for that area of the switching arm that can deform due to temperature change and can at least move with the switching contact. The width and/or a thickness of the switching arm can be constant. This also greatly simplifies manufacture. Furthermore, the switching arm can be designed such that it has no indentations and/or interruptions in its outer shape, i.e. has a closed outline. That enables a very simple design. Furthermore, a deformation can thus be very even, such that the switching arm deforms and moves evenly to achieve a defined switching behavior. The switching operation can therefore advantageously take place at a preset temperature.

In a first embodiment of the invention, the mating contact is arranged fixed and immovable on the heating device, in particular it is in direct or indirect contact with the carrier. This makes design of the heating device very simple. The mating contact together with the mating connection means, which is in particular a plug connection or a plug connection lug, can thus be advantageously fastened on the carrier. Fastening can be achieved, similarly to the switching arm, by riveting. This makes it possible that the mating contact is a part of the mating connection means or a rivet for riveting it. According to a first option, such a rivet can form the mating contact, so that it acts as a contact for the switching contact in addition to its fastening function. It is possible for the mating contact to be connected to a mating connection means or to be fastened to the carrier together with a mating connection means. This in turn permits fastening and electrical contact to be combined. According to a second option, the mating contact can be formed by the mating connection means itself. A raised portion or a kind of rib can protrude here from the mating connection means and form the mating contact, in particular protrude in the direction away from the carrier/towards the switching contact.

In a second embodiment of the invention, the mating contact is arranged movably/moving in itself on the carrier, in particular on a mating contact arm which is fastened on the carrier. The mating contact arm can be designed deformable or resilient such that as the force increases with which the switching arm presses the switching contact against the mating contact and hence against the mating contact arm with increasing heat, it can yield, i.e. can move or deform, in this direction. The mating contact can therefore move away from the switching contact and its pressure. It can preferably yield or move in a direction towards the carrier.

Preferably, the switching arm can generally rest directly on the carrier and be fastened to the carrier together with the arm connecting means placed thereon. In this case, the arm connecting means and, underneath, the switching arm can be riveted to the carrier. In this way, the switching arm is arranged relatively close to the carrier and can thus be heated quickly and directly by the carrier, which is advantageous for fast switching. Fastening the switching arm directly on the carrier or a cover layer provided thereon can also reduce or prevent twisting of the switching arm, for example around a rivet for fastening. Alternatively, it is also possible for the switching arm to rest on a said arm connecting means and thus have a somewhat greater distance to the carrier, if this is desired.

In a further development of the invention, the carrier can be electrically insulated or have electrically insulating material, in particular it can have mica. The carrier can here consist of at least 90% or even completely of mica.

The at least one heating conductor can be attached permanently and irremovably on the carrier, in particular it can be attached as a layer. It can preferably be printed on as a thick-film heating conductor.

The heating conductor can lead to a contact field attached to the carrier, where the switching device can be preferably connected to at least one contact field. Two free ends of the heating conductor can here go to one contact field each, where the two contact fields can have a distance to one another of between 1 cm and 10 cm.

The switching device can in one embodiment be arranged outside a heating area covered by the at least one heating conductor, and it can preferably be arranged between the heating conductor and an outer rim of the carrier. In particular, it can be arranged between an outermost heating conductor and an outer rim of the carrier. It is achieved with the distance that the switching device is not so close to the heating conductors, i.e. is not heated too much or too quickly.

In another embodiment, the switching device can extend over at least one heating conductor, i.e. above it, so that at least one heating conductor extends between the mating contact on the carrier and the fastening of the switching arm to the carrier, i.e. below the switching arm. The switching arm can extend directly over at least one heating conductor or over two heating conductors. This permits, in exact contrast to the embodiment described directly above, that the switching device is exposed relatively directly to the heating effect as it extends above it. This allows a very rapid actuation of the switching device, so that a hot indicator switched thereby is very rapidly activated and can hence warn a user. Advantageously, the switching device is arranged between a central area and an outer rim of the carrier, particularly advantageously closer to the outer rim than to the central area.

A hob in accordance with the invention has a previously described heating device, the hob having a hob plate with an upper side and an underside, and the heating device being arranged with its rear side towards the underside of the hob plate, in particular in contact with the underside of the hob plate. The hob has a hot indication device with a lamp, where the lamp can be switched on and off by the switching device and is connected to the switching device to do so. This takes place at a defined and previously stated temperature.

A current for such a hot indication device can be low, hence the requirements placed on the switching device are not very high. The lamp can advantageously be a glow lamp or an LED. Glow lamps have the advantage that they are very temperature-resistant, and so can also be arranged under a hob plate.

These and further features are found in the description and in the drawings as well as in the claims, where the individual features can each be realized singly or severally in the form of sub-combinations in one embodiment of the invention and in other fields, and can represent designs advantageous and protectable per se, for which protection is claimed here. The subdivision of the application into sub-headings and individual sections does not limit the statements made thereunder in their general validity.

BRIEF DESCRIPTION OF THE DRAWINGS

Examples of the invention are shown in the drawings and are explained in more detail in the following. The drawings show in.

DETAILED DESCRIPTION OF THE EXAMPLES

Figure 1:
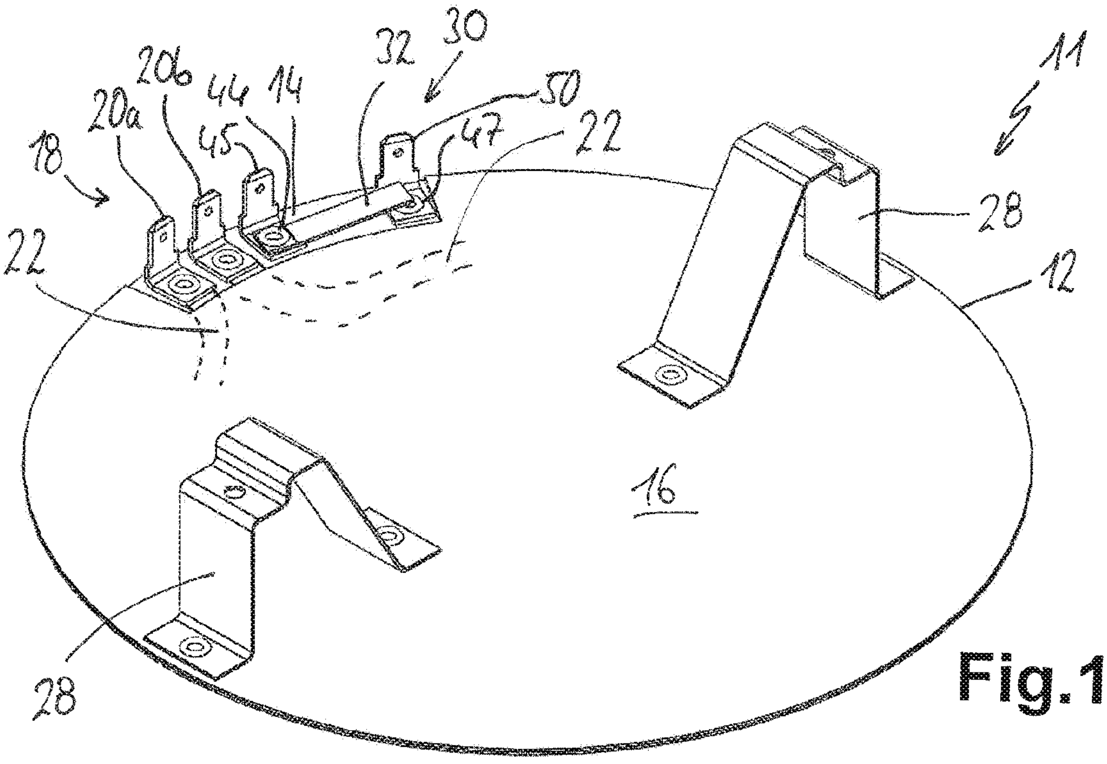
FIG. 1 an oblique view from below onto a heating device in accordance with the invention with a carrier and a switching device in accordance with the invention thereon, FIG. 2 a variation of the heating device from FIG. 1 shown with heating conductors, the switching arms extending over two such heating conductors, FIG. 3 a side view onto a switching arm of angled design of the switching device, FIG. 4 a plan view onto the switching arm from FIG. 3, FIG. 5 a side view of the switching device from FIG. 1 with the switching arm from FIG. 3, showing its change in shape, FIG. 6 a variation of the switching arm from FIG. 3 with continuously curved switching arm, FIG. 7 an installation situation of the heating device as a hot plate heating device in a hob in accordance with the invention, FIG. 8 a variation of the switching arm from FIG. 3 with two angled offsets, FIG. 9 the switching arm from FIG. 8 in an arrangement similar to FIG. 5 and FIG. 10 an oblique view onto the arrangement of the switching arm on the carrier according to FIG. 9, FIG. 11 a variation of the arrangement from FIG. 9, in which a switching arm according to FIG. 3 is mounted underneath an arm plug connection, FIG. 12 a variation of the switching arm from FIG. 8 with two angled offsets in a central section, and FIG. 13 a variation of the arrangement from FIG. 11 with the switching arm from FIG. 12.
Figure 7:
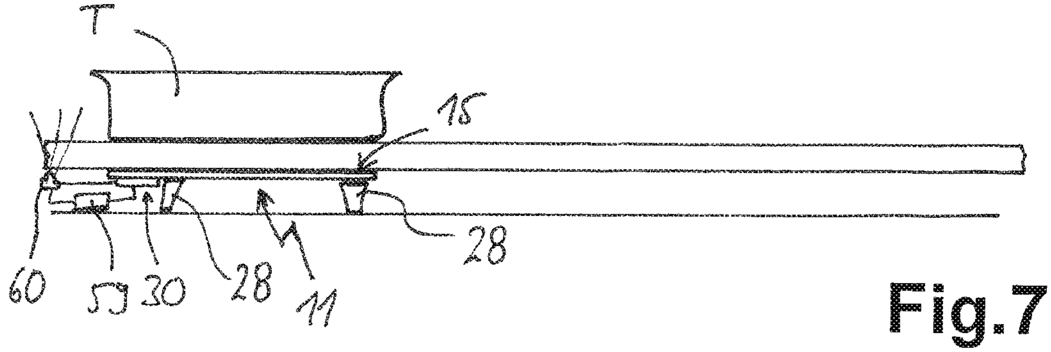

FIG. 1 shows a heating device 11 in accordance with the invention from obliquely below. The heating device 11 is designed as a so-called hot plate heater, as known per se from the prior art and also explained in more detail in the following. It is, as shown in FIG. 7, placed from below against a hob plate and can keep hot a pot T placed over it together with its contents.

The heating device 11 has a planar and flat or smooth carrier 12 that advantageously consists of electrically insulating material. This is particularly advantageously mica. Alternatively it can consist of a ceramic. In a further alternative, it can consist of metal, for example steel, and be electrically insulated on one heating conductor side 14, for example by means of an electrically insulating layer. An embodiment using mica is regarded as advantageous since the material and processing effort needed to do so is low.

Figure 2:
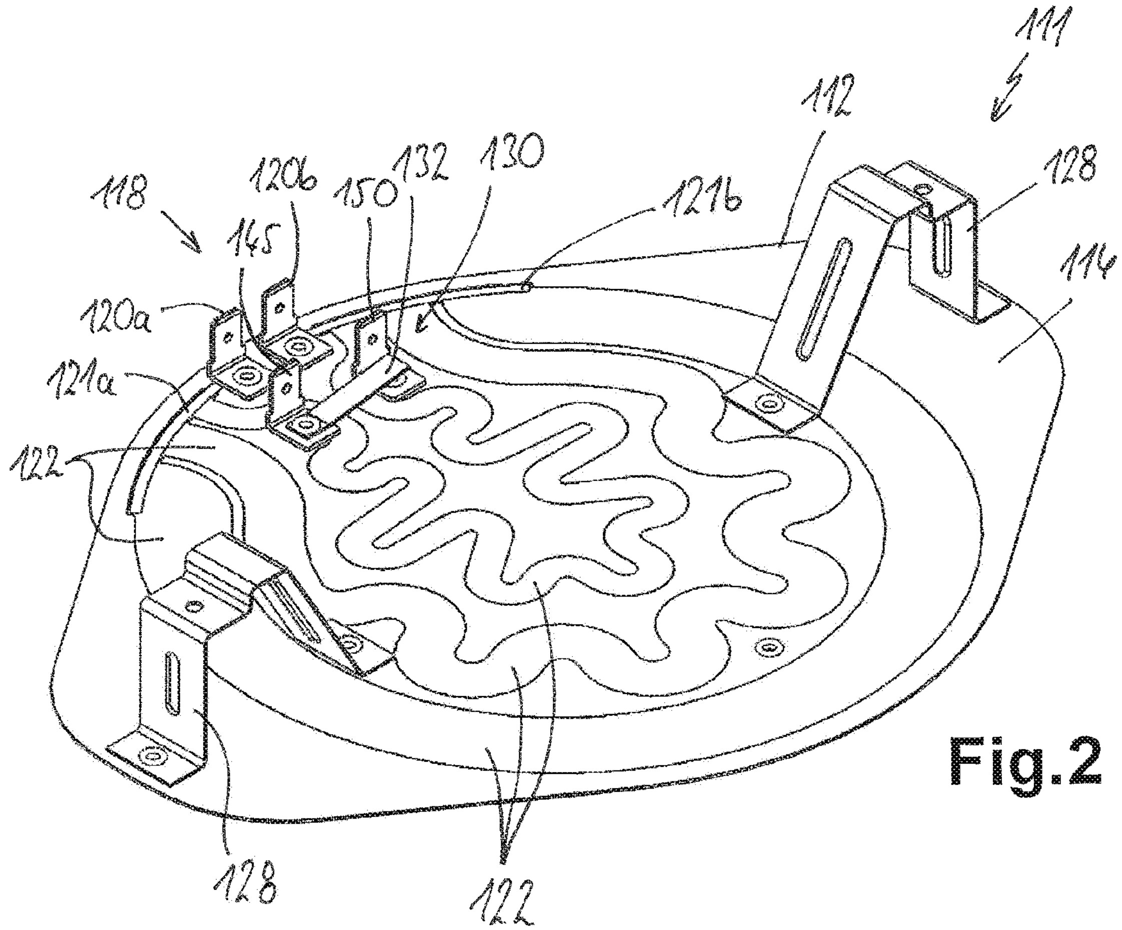

On the heating conductor side 14, heating conductors 22 of differing shape, as also shown in more detail in FIG. 2, extend as shown in dashed lines. They cannot be seen here, since they are covered by a cover layer 16 which can advantageously consist of mica similarly to carrier 12. This cover layer 16 forms an electrical insulation, such that spacers 28 can for example be fastened thereon as metal springs by riveting. These spacers 28 are known per se, reference being made to FIG. 7.

A connection area 18 at which the cover layer 16 is left out is provided on the side of the carrier 12. Two plug connections 20*a* and 20*b* are provided in the connection area 18 on one side and are connected to the heating conductors 22, or the heating conductors 22 extend therefrom. This allows the plug connections 20*a* and 20*b* to be mounted for example on contact fields at the ends of the heating conductors 22, and mechanically fastened thereto by riveting and electrically connected thereto.

In addition to the plug connections 20*a* and 20*b*, a switching device 30 in accordance with the invention is arranged in the connection area 18 and close to the outer rim so that it uses up as little as possible of the surface area of the heating conductor side 14 and at the same time has the greatest possible distance from the heating conductors 22, in particular for the thermal reasons stated above. Then the switching device is heated up as late as possible or as little as possible by the heating conductors 22 as described above, as one embodiment. The switching device 30 has mainly a switching arm 32 designed elongated, straight and very simple. It is described more precisely in the following in FIG. 3 ff.

At the left-hand end, the switching arm 32 is fastened on the carrier 12 using a fastening section 34 together with an arm plug connection 45 by means of a rivet 44. The fastening section 34/switching arm 32 and the arm plug connection 45 are electrically connected to one another.

A mating plug connection 50 is fastened with a rivet 48 on the carrier 12 underneath the right-hand free end 40 of the switching arm 32 as a mating contact, wherein the right-hand free end 40 forms the switching contact section. The upper rivet head 47 forms here the explicit mating contact for a switching contact 42 of the switching arm 32. The switching device 30/switching arm 32 plus the plug connections 45 and 50 are otherwise not electrically connected to anything else, in particular to nothing on the carrier 12 of the heating device 11.

FIG. 2 shows an alternative embodiment of a heating device 111, however without the cover layer from FIG. 1, which should advantageously be made of mica as described above. A plug connection 120*a* from which a curved contact path 121*a* extends leftwards is arranged on the left in the connection area 118. Three heating conductors 122 of differing design and differing shape and width extend from this contact path 121*a*. They each form a circuit counter-clockwise and end at a curved contact path 121*b* arranged on the right and connected to a right-hand plug connection 120*b*. Electrical contact to the heating conductors 122 is achieved in this way.

Whereas in FIG. 1 the switching device 30 is arranged in the connection area 18 and hence outside the area of the heating conductors 22, in FIG. 2 the switching device 130 is deliberately arranged such that it covers at least the innermost path of the heating conductor 122. The two heating conductors 122 pass here underneath the switching arm 132, so that they directly heat the switching device 130. The switching device 130 above the heating conductors 122 can therefore switch particularly rapidly here, since it is heated very rapidly and directly.

The arm plug connection 145 and the mating plug connection 150 are either attached, separated by an insulating layer, in part also directly above the heating conductor 122, or alternatively they are fastened in areas free of heating conductors 122, and in any event, they should be electrically separated from them. The design of the switching device 132 is otherwise precisely as described above for FIG. 1. In the case of FIG. 2, the switching device 130 of course becomes hot very much faster and attains a higher end temperature than is the case in FIG. 1, for which reason the design of the switching device 30 should be somewhat different. Alternatively, it simply just reacts very much faster.

Figure 3:
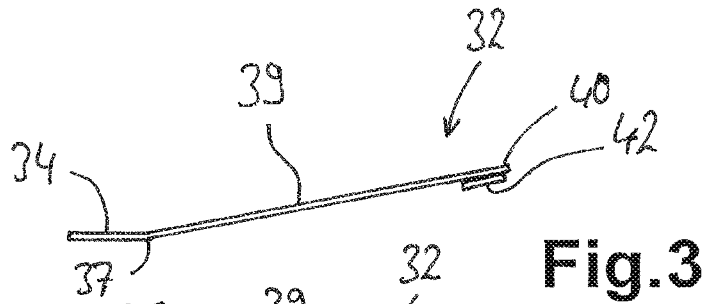
Figure 5:
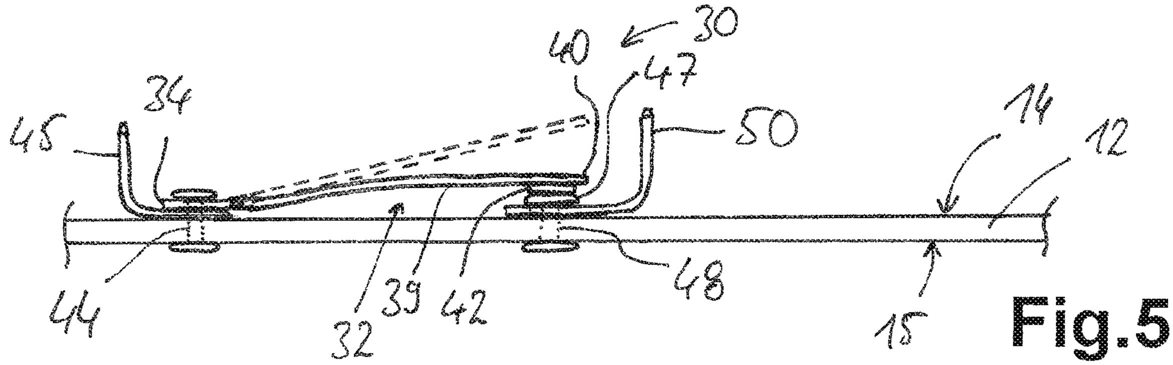

FIG. 3 shows the switching arm 32 magnified in a side view. It has on the left a fastening section 34 which is connected to the free part 39 by means of an angled offset 37. In the cold state or at room temperature, the angle here is around 10° and the free part 39 is exactly straight. The switching arm 32 is formed from a bimetal, the upper layer that faces away from the heating conductor side 14 in FIG. 1 being formed from the metal with the higher thermal expansion coefficient. The layer affixed on the bottom has the lower thermal expansion coefficient. As a result, the switching arm 32 bends downwards with increasing heat, as shown in FIG. 5.

Figure 4:
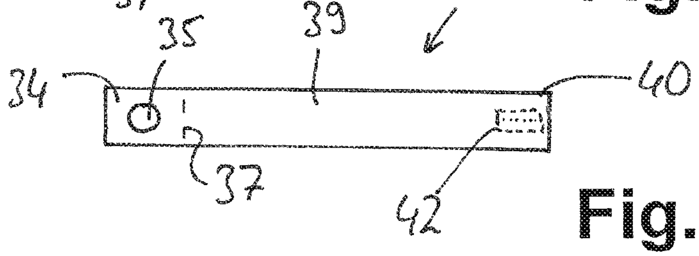

A hole 35 is provided in the fastening section 34, as can be seen from FIG. 4. This allows a rivet 44 to be passed through it for the arrangement in FIG. 5, where first the downward-angled part of the arm plug connection 45 with a corresponding hole is placed at the top on the heating conductor side 14 of the carrier 12. The switching arm 32 with the fastening section 34 is placed thereon, and then riveted by means of the rivet 44. In the area of the switching device 30, the heating conductor side 14 should be electrically insulating, such that only the arm plug connection 45 is connected to the switching arm 32 or to its fastening section 34 and is also electrically connected.

The free part 39 has a constant width and also a constant thickness, as does the entire switching arm 32. At its right-hand free end 40, the free part 39 has a switching contact 42 underneath. This is advantageously designed as a blade contact or has an elongated edge extending in the longitudinal direction of the switching arm 32. Switching therefore takes place along a line. Since only a low current for a hot indicator has to be switched using the switching device 30, the switching contact 42 does not need to be overly complex and/or provided with expensive materials.

It can be discerned from FIG. 4 that for a mating contact to the switching arm 32, the mating plug connection 50 is placed with the lower angled section onto the heating conductor side 14 and then fastened by means of a rivet 48. The upper rivet head 47 of the rivet 48 forms here the mating contact which is contacted by the switching contact 42 in the closed state in FIG. 5. This closes the electrical contact between the arm plug connection 45 and the mating plug connection 50. The rivet head 47 is fully sufficient as the mating contact for the low currents mentioned. This allows a saving in costs for a further separate contact or contact head, which also does not have to be otherwise fastened.

FIG. 5 shows the course of the switching arm 32 at room temperature in dashed lines, and how its switching contact 42 is considerably above the rivet head 47 as the mating contact. As heating begins in the heating device 11 due to a flow of current through the heating conductor 22, the switching device 30 and hence the switching arm 32 too become hotter. A maximum temperature of the heating device 11 in the area of the heating conductors 22 can be around 120° C., also possibly up to 20° C. above or below that. Accordingly, a temperature results at the switching device 30 which leads to deformation of the bimetallic switching arm 32, which begins to bend downwards and so press the switching contact 42 in the direction of the rivet head 47 as the mating contact. At a certain temperature and after a certain time, for example at a temperature of approx. 65° C. at the switching arm 32 and after a time of one minute, the switching arm 32 deforms and bends downwards due to the bimetallic effect far enough for the switching contact 42 to make contact with the rivet head 47. A circuit can thus be closed which either directly activates a lamp for the hot indicator mentioned above or is used in a control system, in particular in a microprocessor, as a switching signal which is then indicated elsewhere. It is significant here that it is not the heating device 11 itself that is influenced in its heating function or switched using the switching device 30.

It is possible for the temperature to rise even further during further operation of the heating device 11, which however in the end only leads to even more bending of the switching arm 32 towards the carrier 12. Due to the contact by the switching contact 42 with the rivet head 47 as the mating contact, it cannot however move any further here. The left-hand fastening section 34 is also fixed. This then leads to the switching arm 32 nevertheless being deformed more strongly towards the carrier 12. Depending on the further temperature rise and further deformation, relatively high forces might occur here. These must be withstood by the switching device 30 and the carrier 12 either in their design, or alternatively it would also be possible to provide at the rivet head 47 not only a rigid mating contact, but also a kind of short spring arm that extends some way from the rivet 48 and for that reason is movable at its free end in the direction of the carrier 12. This free arm can then be pressed by the further force of the switching arm 32 in the direction of the carrier 12. This provides a kind of overpressure protection and hence also a kind of overload protection to prevent damage.

A thickness of the switching arm 32 can be between 0.1 mm and 0.5 mm, which can ensure that it performs in any event the movement according to FIG. 5 due to heating up. At the same time, the force developing at an even higher temperature can however be limited, keeping the risk of damage low.

Figure 6:
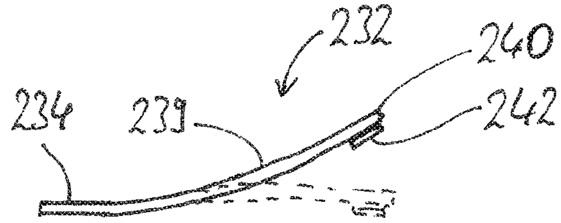

FIG. 6 shows an alternative switching arm 232. It does not have an angled offset, instead a straight fastening section 234 merges here into the free part 239 in a constant curve. This free part 239 is also not straight but bent with the same curvature. It can be provided here that in the cold state or at room temperature, a switching contact 242 on the free end 240 of the free part 239 is just as high above a plane contacted by the fastening section 234 as the angled switching arm in FIG. 3. The continuous curvature may enable better absorbance of its exceedingly high force, with which the switching arm 232 presses against the carrier or a mating contact at elevated temperature.

FIG. 6 shows in dashed lines what shape the switching arm 232 has at elevated temperature or at a temperature at which its switching contact 242 is likely to make contact with a mating contact. This shape is not greatly different to that according to FIG. 5, however a mechanical weakening due to the angled offset is not present or necessary.

FIG. 7 shows a hob 55 in accordance with the invention in simplified form. The hob 55 has a hob plate 56, advantageously consisting of a glass ceramic, with an underside 57. A heating device 11 in accordance with the invention is pressed onto this underside 57 by means of the spacer 28. Advantageously, further heating devices are arranged here, however they are not heating devices in accordance with the invention, but so-called radiant heating devices with a considerably higher power output. A pot T, which is to be kept hot together with its contents at a temperature of around 60° C. to 70° C., is placed above the heating device 11.

The heating device 11 is connected by means of the switching device 30 to a hot indicator 60 in the form of a glow lamp. Furthermore, it is connected to a control 59 by which power is supplied to the hot indicator 60. The hot indicator 60 is therefore activated whenever the switching device 30 is closed. As long as the switching device 30 is closed, the hot indicator 60 will be activated. If the heating device 11 is switched off after a certain operating duration or deliberately by a user, the temperature falls again. When it falls below a certain value, the switching arm 32 of the switching device 30 bends back far enough for the switching contact 42 to move clear of the rivet head 47 as the mating contact. The power supply to the hot indicator 60 is interrupted and it is deactivated. A precise switching temperature can be set or pre-defined for this. As is usual and known for hot indicators of this type, they should be set or pre-defined such that a temperature of 60° C. prevails on the upper side of the hob plate 56 in the area above the heating device 11, and as a consequence of this or at the same time the hot indicator 60 is activated to warn a user. In addition, the information about switching of the switching device 30 can be further processed in the control 59.

Figure 8:
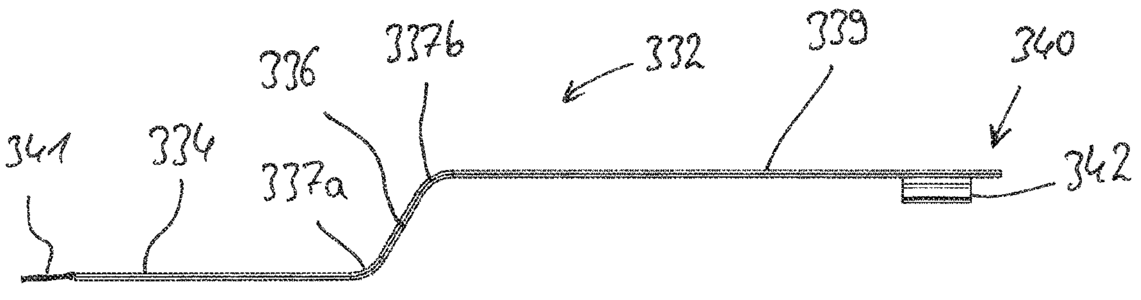

FIG. 8 shows in a side view a further possible embodiment of a switching arm 332 in accordance with the invention. The switching arm 332 has a kind of 'Z' shape with a fastening section 334 at far left a central section 336 and a free part 339. A first angled offset 337*a* of around 60° or 120° is provided between the fastening section 334 and the central section 336. A second and corresponding angled offset 337*b* is provided between the central section 336 and the free part 339, such that the fastening section 334 and the free part 339 are parallel to one another. The fastening section 334 is around three times as long as the central section 336, and the free part 339 is around six times as long as the central section 336. The free part 339 carries here too a switching contact 342 on the underside of its free end 340.

Figure 9:
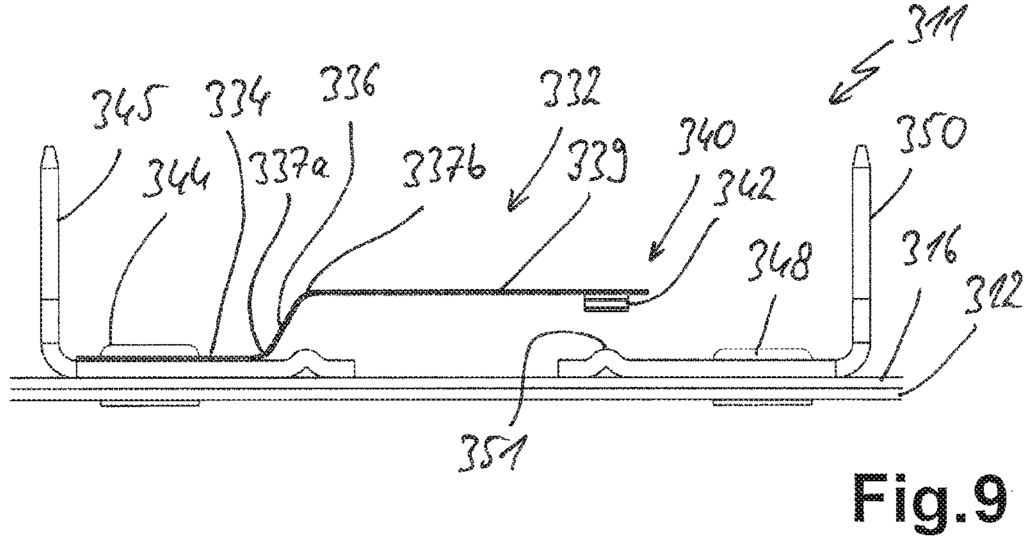
Figure 10:
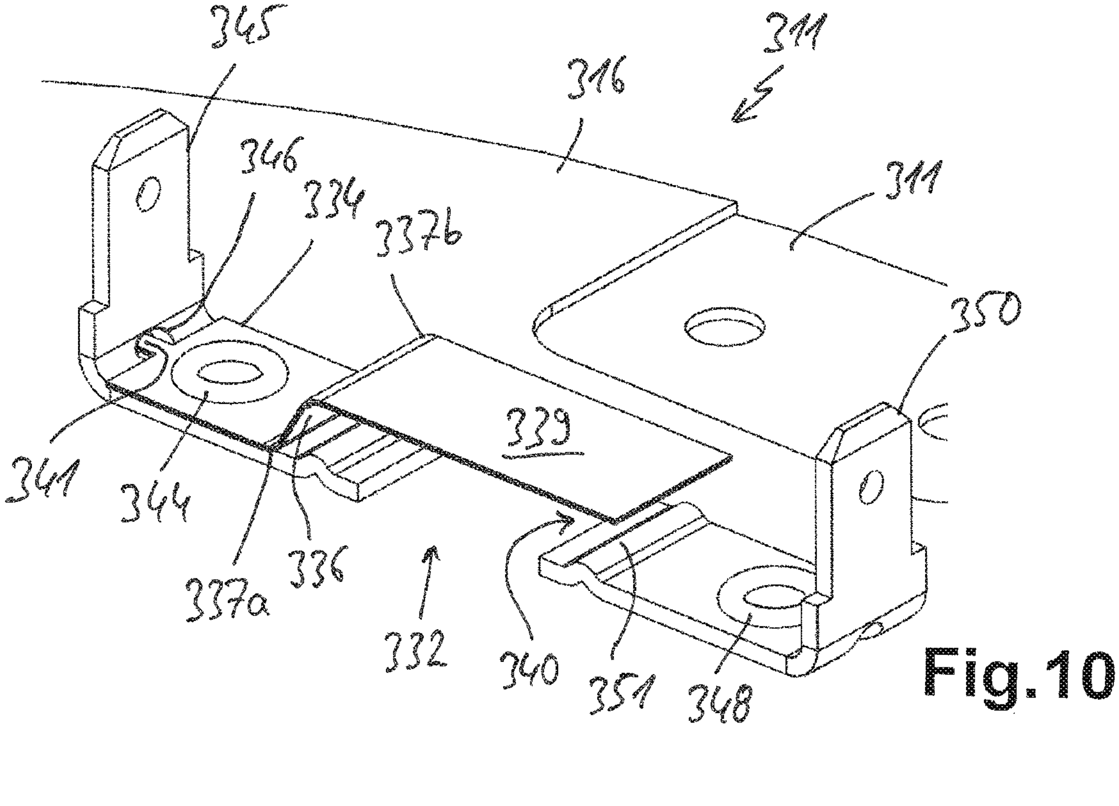

In FIG. 9 in a side view and in FIG. 10 in an oblique view, the switching arm 332 is arranged in accordance with FIG. 8 on a heating device 311 in accordance with the invention. The fastening section 334 is fastened by means of a rivet 344 and an angled arm plug connection 345 to a carrier 312 of the heating device 311. The free end 340 with the switching contact 342 makes contact via a rib 351 of a mating plug connection 350 which is fastened to the carrier 312 by means of a rivet 348. The arm plug connection 345 and the mating plug connection 350 are advantageously designed identical, reducing the number of parts needed. The rib 351 can be created in it by stamping or bending and forms the previously explained mating contact for the switching contact 342. It can be readily seen from the side view that a movement of the switching arm 332 due to heating and the bimetallic effect presses the switching contact 342 against the mating contact of the rib 351.

It can also be discerned from FIG. 10 that a narrow and elongated retaining projection 341 in the form of an arm or a lug protrudes from the fastening section 334 in the same direction. This too is not illustrated in FIG. 8 but is discernable in respect of its design. The retaining projection 341 can be 2 mm to 5 mm long. It is introduced or inserted into a retaining recess 346, designed somewhat larger at the arm plug connection 345, before the two parts are fastened on the carrier 312 by means of the rivet 344. It is clearly discernable that the switching arm 332 can only be rotated about its fastening at the rivet 344 slightly or not at all, due to the retaining projection 341 in the retaining recess 346. This ensures that the position of the switching arm 332 and of its switching contact 342 relative to the rib 351 as a mating contact is always substantially unchangeable and makes dependable switching possible. A corresponding retaining recess can also be discerned in the mating plug connection 350. This retaining recess 346 can additionally simplify the angling of the arm plug connection 345.

Figure 11:
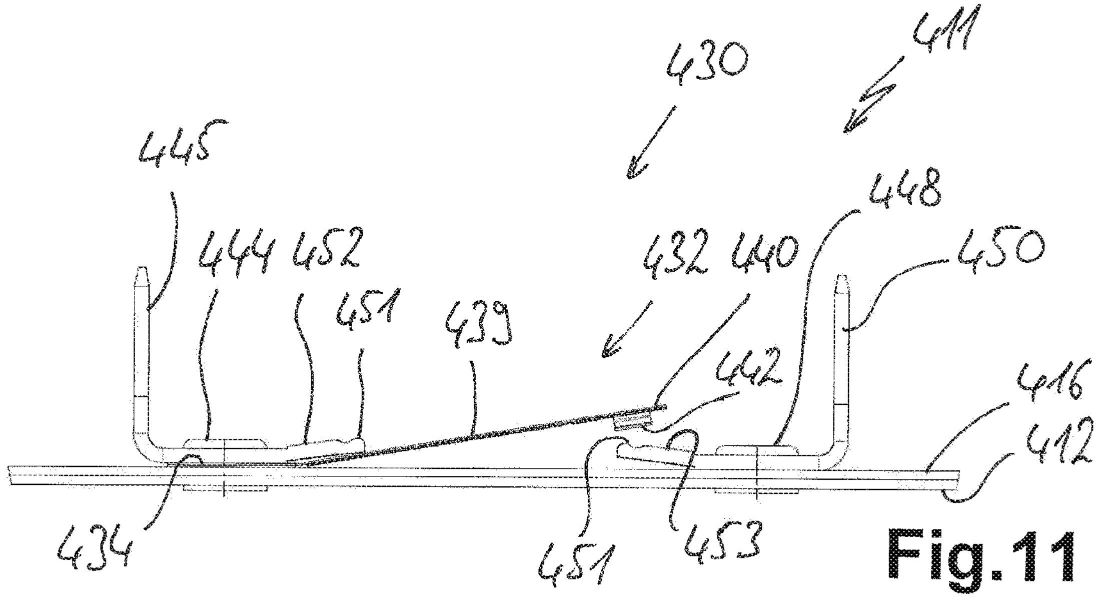

FIG. 11 shows how a switching arm 432, which is designed according to FIGS. 3 and 4, is fastened to a heating device 411 or to a cover layer 416 of a carrier 412. Here, in contrast to FIG. 5, it is noticeable that the switching arm 432 rests directly on the cover layer 416 with a fastening section 434. An arm plug connection 445 is mounted from above or above it and, similarly as previously described, is fastened to the carrier 412 by means of a rivet 444. A rightward facing part 452, at the end of which a rib 451 is disposed, extends above the free part 439 of the switching arm 432. To allow upward movement space for the same, this part 452 is bent slightly upward.

A mating plug connection 450, which is formed in the same way as the arm plug connection 445, and is arranged in mirror image, is fastened directly to the carrier 412 or its cover layer 416 by means of a rivet 448. At a part 453 pointing to the left, a rib 451 is again provided for a switching contact 442 at the lower end of the right free end 440. In FIG. 11, it can be clearly seen that, compared to FIG. 5, the switching arm 432 is arranged closer to the carrier 412 and thus closer to the heat source. Because of this, the switching device 34 with the switching arm 432 reacts more directly or more quickly when heated, i.e. when the switching arm 432 is to move downward to close the contact between the switching contact 442 and the rib 451 as a mating contact.

Figure 12:
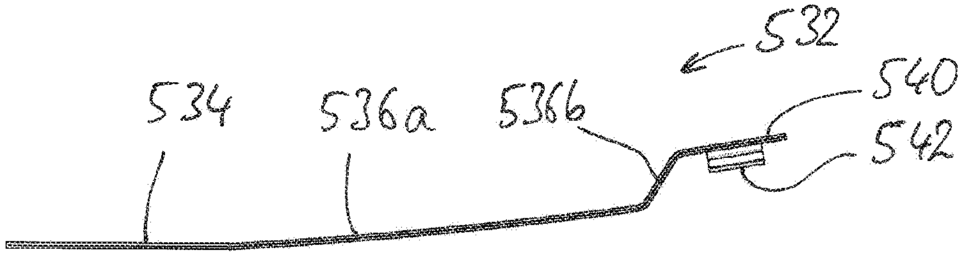

FIG. 12 shows yet another further variation of a switching arm 532. A leftmost first central section 536*a* adjoins a leftmost fastening section 534. The angle between the two is about 80°, so that the left first central section 536*a* is bent or angled about 10° relative to the fastening section 534. To the right of the left or first central section 536*a*, the right second central section 536*b* adjoins with an angulation of about 50°. To the right, it merges with a further, equally large angulation of about 50° into the free end 540, which carries a switching contact 542 on its underside. The left-hand first central section 536*a* and the free end 540 run approximately parallel to one another and are offset from one another in a staircase-like manner, as it were, by means of the right-hand second central section 536*b*. Thus, the switching arm 532 is, so to speak, a switching arm according to FIG. 3, which is seen shortly before the free end 540 with a double bend with a short distance corresponding to the switching arm according to FIG. 8.

Figure 13:
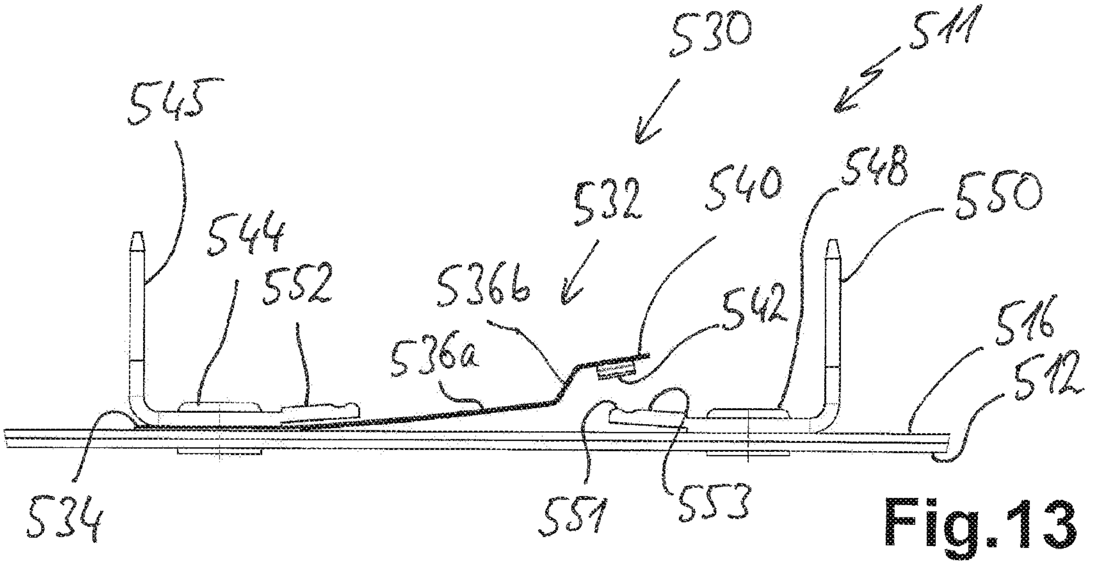

In FIG. 13, the switching arm 540 of FIG. 12 is part of a switching device 530 on a heating device 511. The switching arm 540 is placed directly on a cover layer 516 on a carrier 512 of the heating device 511. It is held in place from above by an arm plug connection 545 including a rivet 544. The arm plug connection 545 is formed exactly as described for FIG. 11.

At a distance to the right of it, an identical mating plug connection 550 arranged in mirror-inverted fashion is fastened directly to the carrier 512 by means of a rivet 548. The vertical distance between the switching contact 542 and a rib 551 on the mating plug connection 550 is slightly less than the vertical distance of the point at the bend between the left central section 536*a* and the right central section 536*b*. Thus, the switching contact 542 is securely in contact with the rib 551 before the right region of the left central section 536*a* abuts the cover layer 516 of the carrier 512. This ensures that the switching arm 532 can be bent downwards until the contacts 542 and 551 are closed, before the switching arm 532 strikes the carrier 512 with a movable section or part, so to speak.

The invention claimed is:

1. Heating device for a hob, said heating device having:

a flat/planar carrier having a heating conductor side and an opposite rear side, at least one heating conductor on said heating conductor side, and a switching device having a movable switching contact and a mating contact associated with said switching contact, wherein:

said switching device has a switching arm movable/moving in itself, said switching arm carries said switching contact and is connected electrically to an electric arm connecting means, said switching contact is arranged on a free end of said switching arm, said switching arm is fastened on said carrier, said mating contact is electrically connected to an electric mating connection means, said switching arm is formed from a bimetal strip, said switching arm rests directly on said carrier and is fastened to said carrier together with said arm connecting means placed thereon, and said switching arm, said switching contact and said mating contact are designed and arranged such that when a pre-defined switching temperature is exceeded, said switching contact and said mating contact are either separated or brought together, triggering a switching operation, by a movement of said switching arm due to increasing heat.

2. Heating device according to claim 1, wherein said switching arm is a bimetal strip and consists of straight sections and of sections angled relative to each other by a maximum of 45° or are correspondingly curved by maximum 45°.

3. Heating device according to claim 1, wherein said switching arm is a bimetal strip and consists of straight sections and/or of sections angled between 15° and 90° or are correspondingly curved, said switching arm consisting of three sections, namely a fastening section for fastening onto said heating device, a central section and a switching contact section adjoining said central section and carrying said switching contact.

4. Heating device according to claim 2, wherein said switching arm is designed without snap function and wherein said switching arm consists of two or three straight sections connected to one another at an angle.

5. Heating device according to claim 3, wherein said fastening section and the switching contact section extend parallel to one another and are two times to ten times as long as said central section.

6. Heating device according to claim 1, wherein said switching arm has a fastening section, wherein a length of a remaining switching arm is movable and has said switching contact at its free end area.

7. Heating device according to claim 2, wherein the switching arm has a central section angled in itself, such that two sections of said central section are angled at an angle of between 1° and 20° to each other.

8. Heating device according to claim 1, wherein said switching arm is a bimetal strip and consists of straight sections and of sections angled between 15° and 90° or are correspondingly curved, said switching arm consisting of three sections, namely a fastening section for fastening onto said heating device, a central section and a switching contact section adjoining said central section and carrying said switching contact, and wherein is said switching arm is fastened with the fastening section.

9. Heating device according to claim 7, wherein a positive connection to said carrier or to said electric arm connecting means is provided at said fastening section, a retaining projection and a retaining recess being provided for said positive connection.

10. Heating device according to claim 9, wherein said retaining projection is provided at said fastening section, said retaining recess being provided on said arm connecting means.

11. Heating device according to claim 1, wherein said switching arm is in strip form or has an elongated rectangular shape and its length is at least two times greater than its width.

12. Heating device according to claim 1, wherein said mating contact is arranged fixed and immovable on said heating device.

13. Heating device according to claim 12, wherein said mating contact together with said mating connection means is fastened onto said carrier, said mating contact being a part of a rivet for riveting said mating connection means to said carrier or being a part of said mating connection means itself.

14. Heating device according to claim 1, wherein said mating contact is arranged movably/moving in itself on said carrier, said mating contact arm being fastened on said carrier and designed so resilient that as a force increases with which said switching arm presses said switching contact against said mating contact with increasing heat, said mating contact arm yields in said direction and said mating contact moves in a direction towards said carrier.

15. Heating device according to claim 1, wherein said carrier is electrically insulated or has electrically insulating material, wherein said carrier consists of at least 90% of mica.

16. Heating device according to claim 1, wherein said at least one heating conductor is attached permanently and irremovably on said carrier, said heating conductor having two ends, each of said two ends leading to a corresponding one of two contact fields attached to said carrier, said switching device being connected to said two contact fields, said two contact fields having a distance to one another of between 1 cm and 10 cm, said mating contact and said switching arm with said switching contact being electrically connected to one of said two contact fields.

17. Heating device according to claim 1, wherein said switching device is arranged above a heating area covered by said at least one heating conductor and extends directly over at least one said heating conductor or over two said heating conductors.

18. Heating device according to claim 17, wherein said switching device is arranged between an outer rim of said carrier and a central area of said carrier.

19. Heating device according to claim 1, wherein said switching device is arranged outside a heating area of said carrier covered by said at least one heating conductor.

20. Heating device according to claim 1, wherein said switching contact has a projecting edge in order to form a linear contact when it contacts a surface or said mating contact.

21. Hob with a heating device according to claim 1, said hob having a hob plate with an upper side and an underside and said heating device being arranged with a rear side towards said underside of said hob plate, said hob having a hot indication device with a lamp, said lamp being switchable on and off by said switching device and being connected to said switching device to do so.

22. Hob according to claim 21, wherein said heating device is in direct contact with said underside of said hob plate.

* * * * *